Dec. 18, 1973     E. J. DUFAULT ETAL     3,780,075
SEPARATION PROCESS

Filed Feb. 5, 1971     2 Sheets-Sheet 1

INVENTORS
Emmanuel Joseph Dufault
David Andrew Heeks
BY

ATTORNEY

United States Patent Office 3,780,075
Patented Dec. 18, 1973

3,780,075
SEPARATION PROCESS
Emmanuel Joseph Dufault, Pittsford, and David Andrew Heeks, Rochester, N.Y., assignors to Syron Corporation, Rochester, N.Y.
Filed Feb. 5, 1971, Ser. No. 112,952
Int. Cl. C11b 1/12
U.S. Cl. 260—412.6
10 Claims

ABSTRACT OF THE DISCLOSURE

The stickwater produced in processes for centrifugally separating fat bearing animal material, such as low temperature mechanical rendering processes, is split into a high fat fraction and a low fat fraction by heating the stickwater to a temperature above about 220° F., preferably from 260° F., to 300° F., and holding the heated stickwater quiescent in a pressurized separator, whereby the stickwater separates into an upper layer containing most of the fat and insoluble defatted solids in the stickwater and a lower layer comprising water and dissolved defatted solids.

BACKGROUND OF THE INVENTION

This invention relates to a separation process and more particularly to a method for removing fat and defatted solids from the stickwater produced in the centrifugal separation of fat bearing animal material, as for example in a low temperature, mechanical rendering process.

Many rendering processes utilize high temperatures to release the fat from the animal tissue. One example of this type of process is provided by U.S. Pat. 3,295,982 to Hickey et al. In this process, the material to be rendered is heated by steam in a pressurized inclined cylindrical cooker. A mixture of fat and water collect in the lower end of the cooker and the residual solid material is carried to the upper end of the cooker by a screw conveyor. The mixture of fat and water that collect in the lower end of the cooker pass through a pipe into a pressurized decanter, which is described in more detail in U.S. Pat. 3,211,535 to Hirahara. In this decanter, the mixture is separated by gravity into a fat or tallow fraction and an aqueous protein fraction referred to as stickwater.

The decanter is held at the same pressure as the cooker to prevent agitation and thus avoid the formation of large quantities of emulsions. As a result, the stickwater produced in this process has a low fat content. However, in this process, as in all similar processes, the high temperature and relatively long heating periods involved degrade the fat, reduce the feed value of the proteinaceous solids, and increase the amount of proteins and other materials dissolved in the stickwater.

In an attempt to avoid the problems of high temperature rendering, a number of low temperature mechanical rendering processes have been developed. In these processes, the fat cells are ruptured by mechanical force instead of by high temperatures. Typically, the material to be rendered is heated to reduce the viscosity of the fat and then centrifugally separated into a fat bearing liquid stream and a stream of wet defatted solids containing protein.

The fat bearing liquid stream is then fed to a second centrifuge where it is separated into at least two phases. One of the phases contains most of the fat from the original animal material. The second phase is the stickwater effluent. The stickwater contains emulsified fat and suspended and dissolved defatted solids.

In processes such as these, the material to be rendered does not have to be heated to as high a temperature or for as long a period of time. As a result, the fat that is produced has a more acceptable color and contains fewer fatty acids and peroxides. In addition, the proteinaceous solids have a higher feed value and less protein is dissolved in the stickwater. However, due to the agitation that occurs during the centrifugal separation steps, more fat is emulsified and carried out in the stickwater. The stickwater also contains a higher percentage of suspended and dissolved solids containing protein. Thus, valuable fats and proteins are lost. The protein and fat in the stickwater can be recovered by evaporation and drying, however, the meal produced in such a process usually contains too much fat for animal meal. As a result, it is usually uneconomical to try to recover the fats and proteins in the stickwater. However, the levels of fat and suspended solids in the stickwater will frequently be substantially above the level which some public sewage systems will accept without charging a penalty. The stickwater can be treated to bring it within acceptable limits, but extensive treatment is required to accomplish this and as a result, in most cases it is more economical to throw the stickwater away and pay the penalty.

A variety of techniques, such as those disclosed in U.S. Pats. 3,222,384 to Blumberg et al. and 3,519,662 to Gruver et al., are used to reduce the amount of fats and solids in the stickwater. However, even under the best of operating conditions, enough fats and solids are usually carried out with the stickwater to constitute a significant economic loss and to present a sewage problem.

OBJECTS OF THE INVENTION

It is an object of this invention to provide a low temperature mechanical rendering process which produces stickwater containing less emulsified fat and suspended solids. This process may be used for rendering any fat bearing animal material, including fowl and fish material, offal, bones, hide fleshings, ears or the like to produce either or inedible fats.

Another object of this invention is to provide a low temperature mechanical rendering process which produces a stickwater which can be treated to reduce the levels of fat, oil and suspended solids to within acceptable limits more easily or which can be dried to produce a meal having a satisfactory fat content for use in animal feeds.

A still further object of this invention is to provide a method for removing emulsified fats and suspended solids from the stickwater discharged by a centrifugal separator.

Other objects and advantages of this invention will be apparent from the following description.

SUMMARY OF THE INVENTION

In the process of this invention, the stickwater effluent from a centrifugal separator, which comprises water, emulsified fat and defatted animal solids containing protein, is heated to a temperature above about 220° F. and held quiescent in a pressurized vessel, preferably for at least 5 minutes. This breaks the fat water emulsion. As a result, the stickwater separates into two layers; an upper layer which contains most of the fat in the stickwater, and a lower layer with a low fat content. Insoluble solids are accumulated in the upper layer with the fat while soluble materials, including some protein and various salts, are dissolved in the lower aqueous layer. Thus, the stickwater is separated into two layers, an upper layer comprising fat and insoluble defatted animal solids and a lower layer comprising water and dissolved defatted solids.

Typically, the method of this invention is used in a low temperature mechanical rendering process wherein the fat bearing animal material to be rendered is centrifugally separated into a fat bearing liquid stream and a stream of wet solids. The fat bearing liquid stream is then centrifugally separated into at least two phases; one of which comprises fat and another of which comprises stickwater. The stickwater is then heated and injected into a pressurized tank where it is separated into two layers as described above.

Fat and insoluble defatted solids may be withdrawn from the upper layer in the stickwater separator and added either to the material to be rendered or to the fat bearing liquid stream produced in the first centrifugal separation step. In either case, the fat withdrawn from the stickwater separator will be recovered in the fat phase in the second centrifugal separation step. The defatted solids will be recovered with the solids discharged in either the first or second centrifugal separation step, depending on where the fat and insoluble defatted solids withdrawn from the stickwater separator are added to the system.

DETAILED DESCRIPTION

Figure 1:
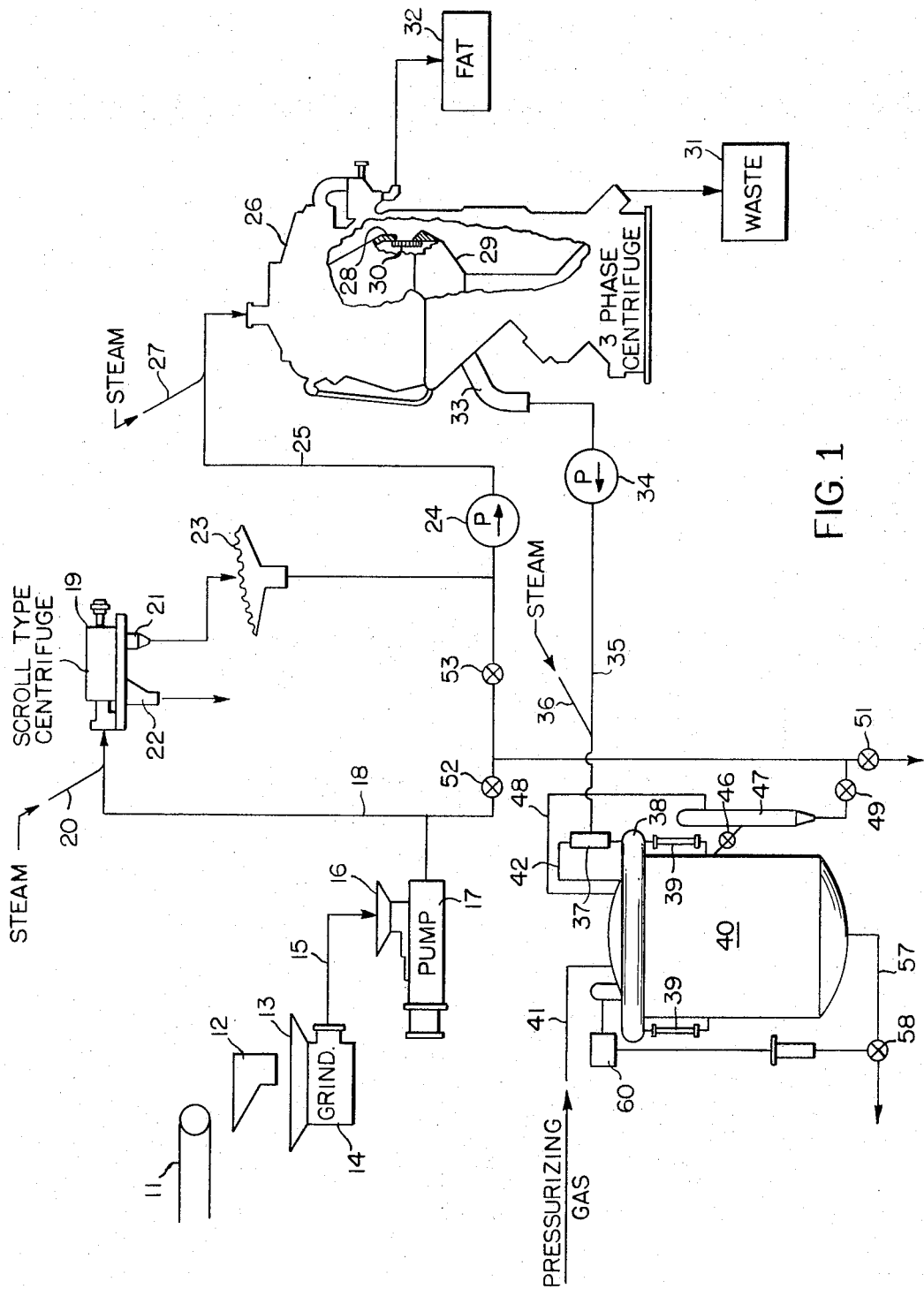
FIG. 1 is a schematic flow diagram of one form of apparatus that can be used to practice the process of this invention.

In FIG. 1, reference numeral 11 indicates a conveyor or other suitable apparatus for movement of raw animal material to the rendering system. Conveyor 11 deposits the raw animal material in a hopper or funnel 12 that discharges into the inlet 13 of a grinder 14 that reduces the particle size of the raw fat bearing animal material.

If the material to be rendered is moved from the slaughtering point or other source by water, a duct having a sluice of water may be used in place of conveyor 11. If the quantity of water is not too great, it may be delivered to hopper 12 for movement to the grinder 14 substantially in the same manner as the relatively dry state material. If the quantity of water is too great, a portion of it may be removed in a preliminary separation process such as a screening process to facilitate economical operation of the rest of the system.

The grinder is preferably of the type that will grind the material in a cold state. If the grinder requires preheating of the material, steam may be sparged into a flow or stream of the material in the inlet 13. Preferably, the material should not be preheated to more than about 140-160° F. and it is preferred that the grinding be done in a cold state. The grinder 14 may be a disintegrator or a combination of machines such as a prebreker followed by a plate grinder. The grinding should be performed in a manner to produce as few very fine particles as possible. High speed impact machinery such as a disintegrator tends to produce some fines and with such a grinder a screen size of 1" diameter holes is preferred. A plate grinder, being low speed equipment, tends to cut the material to bits of a predetermined size and avoids production of very fine material. In the case of a plate grinder, a hole size of ½" to 1" is preferred although smaller sizes as to ¼" could be used. Production of a large number of fine particles in the grinding stage can result in such particles becoming incapsulated with fat. This makes it more difficult to separate the fat from the solids by centrifugal separation.

The reduced material is discharged from the grinder 14 and flows through a pipe 15 to a hopper 16 or the like, from which it passes into a pump 17. There may be a slight amount of water accompanying the raw reduced material and this, together with the liquids from the material form a flowable mass. The pump 17 forces the flowable mass through a pipeline 18 to a scroll type centrifugal separator 19. While the material is passing through pipeline 18 it is heated by steam injection to reduce the viscosity of the fat and facilitate its passage through cell walls. In order to minimize degradation of the fat and the amount of protein that goes into solution, the temperature to which the material is heated and the time at which it remains at that temperature should be minimized. Preferably, the material should be heated to a temperature of approximately 200° F. as it enters the centrifuge 19. The period of time during which the material is at that temperature is kept at a minimum by heating the material by direct steam injection. The steam is injected into the flow line 18 by temperature responsive steam sparging connections or live steam injection units 20 located immediately ahead of the centrifuge inlet. In centrifuge 19 the fat bearing animal material is separated into a fat bearing liquid stream which is discharged at 21 and a wet cake of defatted solids which is discharged at 22. The liquid stream contains substantially all of the fat which was in the original animal material. The wet cake contains 85–95% of the solids in the original material.

The fat bearing liquid stream then passes through a vibrating screen 23 or the like of approximately 12 to 20 mesh screen size to remove remaining solid or semi-solid particles of a size which may clog or damage equipment later used in the process. The flowable liquids and very fine solids and semi-solids remaining in the fat bearing liquid stream which passing through the vibrating screen 23 are forced by a pump 24 through pipeline 25 to a three phase centrifuge 26. In pipe 25 the temperature of the fat bearing liquid stream is raised to approximately 200° F. by injecting steam through a temperature responsive steam sparging connection 27. Again, the sparging connection should be located near the inlet to the centrifuge to minimize the period during which the material is at an elevated temperature.

The three phase centrifuge 26 is a type wherein the outer face 28 of the bowl 29 is periodically opened by withdrawing gate 30 to discharge all bowl contents. This type of centrifuge is used because even after the various steps of the process above described heavy solid fines and interfacial solid fines still make up a significant part of the material delivered to the centrifuge. The heavy solid fines may tend to clog a nozzle type centrifuge. More troublesome, however, are the interfacial solid fines which tend to collect between the fat and water phases in the bowl and eventually stop fat production. To prevent this, the entire bowl contents are periodically discharged to a waste receiver 31.

Figure 2:
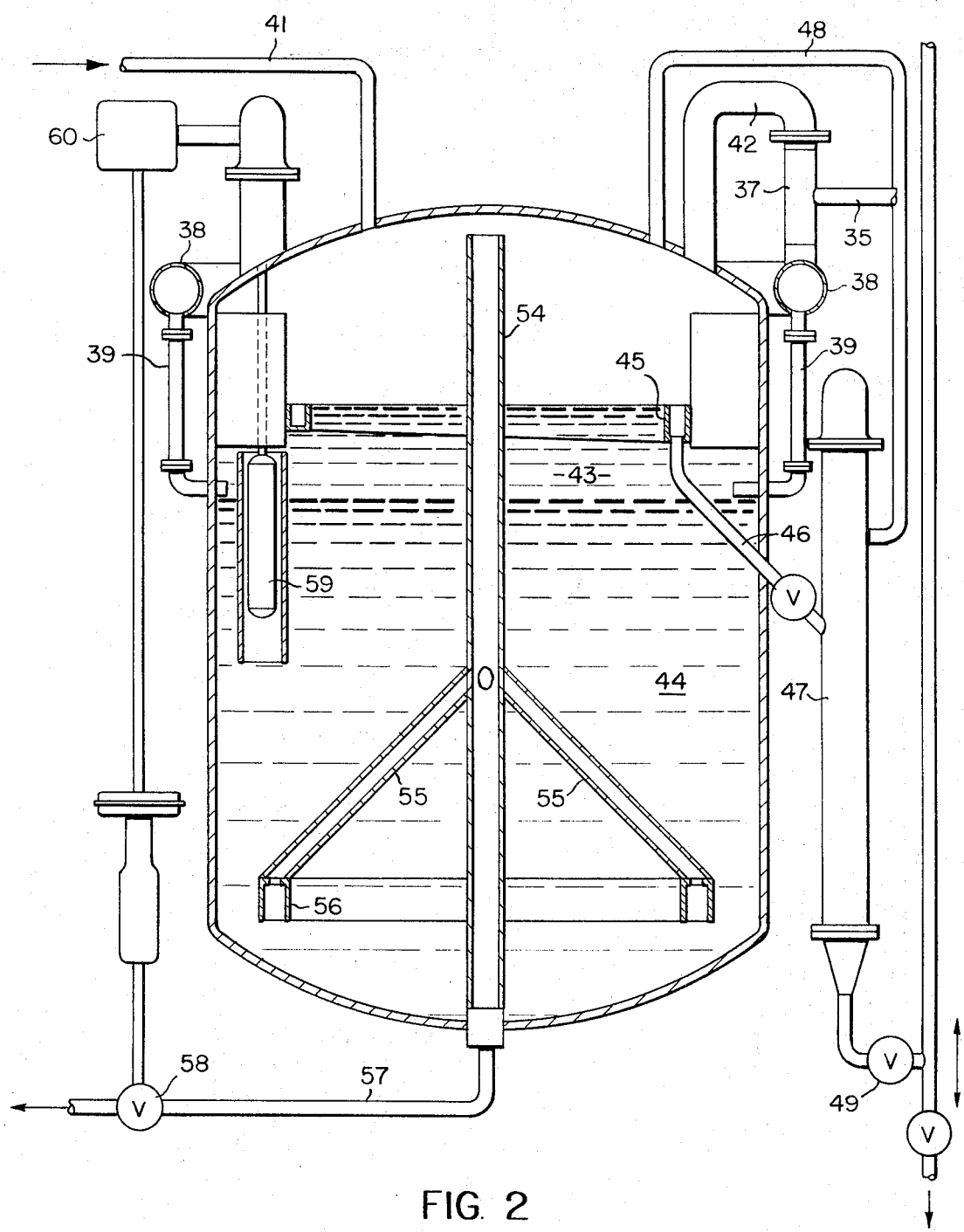
FIG. 2 is a cross-sectional view of the stickwater separator shown in FIG. 1.

In addition to the waste, centrifuge 26 produces a fat phase which is discharged to a storage vessel 32 and a waste water or stickwater phase which is discharged at 33. The stickwater is forced by pump 34 through pipe 35 wherein it is heated by direct steam injection through sparging connections 36 to a temperature above about 220° F. Preferably, the stickwater is heated to a temperature in the range of 260–300° F. From pipe 35, the heated stickwater passes into a turbulence reduction chamber 37, from which it passes through a header 38 and one of six connecting pipes 39 into a stickwater separator 40, which is shown in more detail in FIG. 2. The turbulence reduction chamber, header and connecting pipes are used to provide relatively smooth flow of the stickwater into the separator and thereby minimize agitation of the stickwater in the piping and in the separator.

Separator 40 is maintained at a pressure above the vapor pressure of the heated stickwater by gas supplied from a compressed gas source (not shown) through pipe 41. The separator is normally maintained at a pressure of from about 45 to 75 p.s.i.g. The pressurizing gas is also supplied to the turbulence reduction chamber 37 through an equalizing pipe 42 which connects the top of the separator with the top of the turbulence reduction chamber. Thus, the turbulence reduction chamber is maintained at the same pressure as the stickwater separator.

The rates at which stickwater is supplied to and materials are withdrawn from the separator are adjusted so that the heated stickwater will remain quiescent in the separator for an average of 5 to 30 minutes. During this time, the stickwater separates into an upper layer 43 comprising fat and insoluble defatted solids and a lower layer 44 comprising water and dissolved defatted solids. This separation is brought about by the high temperature in the separator which deemulsifies most of the fat and coagulates some of the suspended and dissolved protein in the stickwater. The deemulsified fat and the coagulated protein are lighter than water, thus they collect in the upper layer 43. As a result, the lower layer 44 contains relatively little fat.

Since the stickwater is being separated into two layers in the separator, it should be clear that the term "quiescent," as used herein, does not mean that the stickwater is completely at rest. As used in this application, the stickwater should be considered to be quiescent if it is not subjected to agitation, as for example by boiling, which would prevent the emulsion from separating. It should also be clear that the figures used in this application for the length of time that the stickwater remains in the separator are averages for all the material passed through the separator. Some of the stickwater may pass through in less than the stated times while other parts may take longer.

Material is withdrawn from at least one of the layers in the separator to maintain the interface between the layers at a preselected position. The interface is usually maintained somewhere in the vicinity of the inlet from the six connecting pipes 39. Fat and insoluble solids in upper layer 43 spill over into an annular collection channel 45 which is adjustably supported in the upper part of the separator. From collection channel 45 the fat and insoluble solids pass through pipe 46 to a discharge chamber 47. The discharge chamber is maintained at the same pressure as the separator by pressurizing gas supplied through equalizing line 48. This helps to achieve smooth discharge of the fat and insoluble solids from the separator.

The fat and solids are discharged from discharge chamber 47 through diaphragm valve 49, which is controlled by the level control unit operated by a float within the discharge chamber 47. As shown in FIG. 1, the fat and insoluble solids may be withdrawn through valve 51 to a suitable collection source, or they may be returned to the rendering system through either valve 52 or valve 53. The material which passes through valve 52 is mixed with the raw animal material to be rendered, while any material passed through valve 53 is mixed with the fat bearing liquid stream produced in the first centrifugal separation step. In either case, the fat withdrawn from the upper layer in the stickwater separator is collected with the fat phase discharged from the three phase centrifuge 26 to storage vessel 32. If the material is mixed with the raw animal material to be rendered, at least part of the insoluble defatted solids withdrawn from the upper layer of the separator will be recovered with the wet solids in the first centrifugal separation step. If the material is passed through valve 53 and mixed with the fat bearing liquid stream from the first centrifuge, the insoluble defatted solids withdrawn from the stickwater separator will be discharged with the rest of the solids from the three phase centrifuge 26 to waste receptacle 31.

Referring again to FIG. 2, there is a standpipe 54 within the separator 40. Four collection pipes 55 lead from an inverted annular collection channel 56 to the standpipe. Water and dissolved solids from layer 44 pass up through the collection pipes 55 into the standpipe 54 and down through the standpipe to discharge line 57. The rate at which water is withdrawn through line 57 is controlled by diaphragm valve 58, which in turn is controlled by a float 59 within the separator that operates a level control unit 60.

Due to the low levels of fat and suspended solids in the water withdrawn from the lower layer 44, this material can usually be discharged to public sewage systems without incurring a penalty. If the fats and suspended solids do exceed permissable levels, they can be removed more easily from the stickwater that has been treated by the process of this invention than from untreated stickwater because the treated stickwater is largely deemulsified. For example, the treated stickwater is much more amenable to treatment by polyelectrolytes according to conventional settling techniques. Alternatively, if the water contains an appreciable quantity of dissolved protein, it may be desirable to dry the stream of material to produce a low fat meal which can be used for animal feed.

EXAMPLE 1

A mixture of 59.6% offal, 11.0% bone and 29.4% ears by weight was rendered in a system similar to the one described above. The stickwater discharged from the three phase centrifuge analyzed 3.6% total solids, including 1.47% fat, by weight. This stickwater was heated by steam injection to 270° F. and injected into a stickwater separator maintained at a pressure of 45 p.s.i.g. The separator contained 22 gallons of stickwater and fresh stickwater was added at a rate of 1.2 g.p.m. Thus, the average residence time in the separator was 18.3 minutes.

The material removed from the upper layer in the separator analyzed 19.5% total solids, including 14.8% fat. The water removed from the lower layer contained 1.7% total solids, including 0.06% fat.

EXAMPLE 2

A mixture of 61.4% offal, 15.1% bone and 23.5% ears was rendered in the same system. The stickwater effluent from the three phase centrifuge, which contained 4.5% total solids, including 1.73% fat, was heated to a temperature of 260° F. by steam injection and injected into the stickwater separator at a rate of 1.6 g.p.m. The separator was maintained at a pressure of 46 p.s.i.g. The material removed from the upper layer contained 48% total solids including 35.6% fat. The water discharged from the bottom level contained 2.3% total solids, including 0.17% fat.

Example 3

Bones were rendered by the same system, yielding a stickwater effluent from the three phase centrifuge that contained 2.6% total solids, including 1.57% fat. This stickwater was heated to 266° F. and fed to the separator at 1.5 g.p.m. The separator was pressurized to 50 p.s.i.g. The discharge from the upper layer analyzed 18.5% total solids, including 12.5% fat. The water discharged from the lower layer analyzed 0.5% total solids, including 0.05% fat.

Example 4

Mixed poultry materials were rendered with the same system. The stickwater from the three phase centrifuge, which contained 9.4% total solids, including 3.4% fat, was heated to 262° F. and fed to the separator at 1.5 g.p.m. The separator was pressurized to 46 p.s.i.g. The discharge from the upper layer contained 38.4% total solids, including 30.5% fat. The water discharged from the lower layer contained 2.1% total solids, including 0.13% fat.

Example 5

A mixture of 64% edible beef fat and 36% bone was rendered by the same system, yielding a stickwater effluent from the three phase centrifuge that contained 2.5% total solids, including 0.95% fat. The stickwater was heated to 280° F. and fed into the stickwater separator at a rate of 1.5 g.p.m. The separator was pressurized to 44 p.s.i.g. The material removed from the upper layer contained 14.6% total solids, including 11.4% fat. The water discharged from the lower layer contained 0.8% total solids, including 0.02% fat.

From these examples it should be clear that this invention can be used in the rendering of many diverse materials. It should also be clear to one skilled in the art that many modifications may be made to the system described above within the scope of this invention, which is delineated by the following claims.

We claim:

1. In a process wherein fat bearing animal material is centrifugally separated and stickwater consisting essentially of water, emulsified fat and defatted solids is produced, the improvement comprising:
   (a) heating the stickwater to a temperautre above about 220° F.; and
   (b) holding the heated stickwater quiescent in a pressurized vessel at a pressure above its vapor pressure, whereby the stickwater is separated into an upper layer comprising fat and insoluble solids and a lower layer consisting essentially of water and dissolved solids.

2. A process according to claim 1 wherein the stickwater is heated to a temperature of 260 to 300° F.

3. A process according to clam 1 wherein the pressure in the pressurized vessel is 45 to 75 p.s.i.g.

4. A process according to claim 1 wherein the heated stickwater is held quiescent in said pressurized vessel for 5 to 30 minutes.

5. A process according to claim 1 wherein water and dissolved solids are withdrawn from the lower layer and dried to produce a meal having a low fat content.

6. A low temperature, mechanical process for rendering fat bearing animal material comprising:
   (a) centrifugally separating the animal material into a fat bearing liquid stream and wet solids;
   (b) centrifugally separating the fat bearing liquid stream and producing a fat phase and stickwater consisting essentially of water, emulsified fat and defatted solids;
   (c) heating the stickwater to a temperature above about 220° F.; and
   (d) holding the heated stickwater quiescent in a pressurized vesel at a pressure above its vapor pressure, whereby the stickwater is separated into an upper layer comprising fat and insoluble solids and a lower layer consisting essentially of water and dissolved solids.

7. A process according to claim 6 wherein fat and insoluble solids are withdrawn from said upper layer and mixed with the fat bearing liquid stream produced in the first centrifugal separation step, whereby the fat withdrawn from said upper layer is recovered in the fat phase in the second centrifugal separation step.

8. A process according to claim 6 wherein fat and insoluble solids are withdrawn from said upper layer and mixed with the animal material to be rendered, whereby at least part of said insoluble solids are recovered with the wet solids in the first centrifugal separation step and the fat withdrawn from the upper layer is recovered in the fat phase in the second centrifugal separation step.

9. A low temperature, mechanical process for rendering fat bearing animal material comprising:
   (a) centrifugally separating the animal material into a fat bearing liquid stream and wet solids;
   (b) centrifugally separating the fat bearing liquid stream and reducing a fat phase and stickwater consisting essentially of water, emulsified fat and defatted solids;
   (c) heating the stickwater to a temperature above about 220° F.;
   (d) continuously adding the heated stickwater to a vessel held at a pressure above the vapor pressure of said heated stickwater, wherein the heated stickwater is separated into an upper layer comprising fat and insoluble solids and a lower layer consisting essentially of water and dissolved solids; and
   (e) continuously withdrawing material from at least one of said layers to maintain the interface between the upper and lower layers at a preselected position.

10. A process according to claim 9 wherein:
   (a) the stickwater is heated to a temperature of 260 to 300° F.;
   (b) the pressure in the pressurized vessel is 45–75 p.s.i.g.; and
   (c) the heated stickwater is held quiescent in said pressurized vessel for 5 to 30 minutes.

References Cited

UNITED STATES PATENTS

| | | | |
|---|---|---|---|
| 2,748,152 | 5/1956 | Sifferd et al. | 260—412.6 |
| 2,911,421 | 11/1959 | Greenfield | 260—412.6 |
| 3,352,841 | 11/1967 | Lyon | 260—412.6 |
| 3,352,842 | 11/1967 | Lyon | 260—412.6 |
| 3,449,315 | 6/1969 | Aikins | 260—412.6 |

ELBERT L. ROBERTS, Primary Examiner

J. R. BROWN, Assistant Examiner

PO-1050
(5/69)

UNITED STATES PATENT OFFICE
CERTIFICATE OF CORRECTION

Patent No. 3,780,075      Dated December 18, 1973

Inventor(s) E. J. Dufault et al

It is certified that error appears in the above-identified patent and that said Letters Patent are hereby corrected as shown below:

Column 2, line 37, after "either" insert -- edible --.

Column 3, line 51, correct the spelling of "prebreaker".

Column 7, line 41, correct the spelling of "vessel".

Column 8, line 16, change "reducing" to -- producing --.

Signed and sealed this 7th day of May 1974.

(SEAL)
Attest:

EDWARD M. FLETCHER, JR.
Attesting Officer

C. MARSHALL DANN
Commissioner of Patents